(12) United States Patent
Wu

(10) Patent No.: US 8,970,832 B2
(45) Date of Patent: Mar. 3, 2015

(54) OPTICAL TESTING METHOD AND SYSTEM FOR 3D DISPLAY PRODUCT

(71) Applicant: Beijing BOE Optoelectronics Technology Co., Ltd., Beijing (CN)

(72) Inventor: Hao Wu, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 13/943,916

(22) Filed: Jul. 17, 2013

(65) Prior Publication Data

US 2014/0043600 A1 Feb. 13, 2014

(30) Foreign Application Priority Data

Aug. 10, 2012 (CN) .......................... 2012 1 0285660

(51) Int. Cl.
*G01B 9/00* (2006.01)
*G01M 11/02* (2006.01)
*H04N 13/04* (2006.01)
*H04N 17/04* (2006.01)
*H04N 17/00* (2006.01)

(52) U.S. Cl.
CPC ............... *G01M 11/02* (2013.01); *H04N 13/04* (2013.01); *H04N 17/04* (2013.01); *H04N 13/0402* (2013.01); *H04N 13/0425* (2013.01); *H04N 17/00* (2013.01)
USPC ......................................................... 356/124

(58) Field of Classification Search
CPC .......... H04N 13/0438; H04N 13/0497; H04N 13/0495; H04N 13/0425; H04N 13/0278; H04N 13/0456; H04N 13/0484; H04N 13/0452; H04N 2213/008; H04N 13/0459; H04N 19/00769; H04N 13/0059; H04N 13/0427
See application file for complete search history.

(56) References Cited

U.S. PATENT DOCUMENTS

| 8,704,880 B2* | 4/2014 | Lim et al. .......................... 348/51 |
| 2010/0328653 A1* | 12/2010 | Liu et al. ....................... 356/218 |
| 2011/0051239 A1* | 3/2011 | Daiku ........................... 359/464 |
| 2012/0050498 A1 | 3/2012 | Jung et al. |

(Continued)

FOREIGN PATENT DOCUMENTS

| CN | 102523479 A | 6/2012 |
| CN | 201774634 U | 7/2013 |

(Continued)

OTHER PUBLICATIONS

Extended European Search Report dated Jun. 12, 2013; Appln. No. 13173951.8-1902.

(Continued)

*Primary Examiner* — Michael P Stafira
(74) *Attorney, Agent, or Firm* — Ladas & Parry LLP

(57) ABSTRACT

An optical testing method and system for 3D display products are disclosed, the method comprising: the 3D display product to be tested displaying white light and/or black light, a left eye lens and a right eye lens receiving white light signals and/or black light signals of left eye pixels and right eye pixels respectively and transmitting them to a data processor for processing, obtaining test results for brightness difference; the 3D display product to be tested displaying primary colors, the left eye lens and the right eye lens receiving light signals of the left eye pixels and the right eye pixels respectively and transmitting them to the data processor for processing, and obtaining test results for color difference.

10 Claims, 2 Drawing Sheets

(56) References Cited

U.S. PATENT DOCUMENTS

| | | | |
|---|---|---|---|
| 2012/0105604 A1* | 5/2012 | Lim et al. | 348/51 |
| 2012/0105871 A1* | 5/2012 | Kim et al. | 356/614 |
| 2012/0154808 A1* | 6/2012 | Lin et al. | 356/400 |

FOREIGN PATENT DOCUMENTS

| | | |
|---|---|---|
| EP | 2 424 258 A2 | 2/2012 |
| EP | 2 445 225 A1 | 4/2012 |
| KR | 20120018927 A | 3/2012 |

OTHER PUBLICATIONS

Korean Examination Opinion dated Jul. 10, 2014; Appln. No. 10-2013-0084307.

European Patent Office Communication dated Oct. 22, 2014; Appln. No. 13 173 951.8-1902.

* cited by examiner

OPTICAL TESTING METHOD AND SYSTEM FOR 3D DISPLAY PRODUCT

TECHNICAL FIELD

Embodiments of the present disclosure relate to an optical testing method and an optical testing system for three dimensional (3D) display products.

BACKGROUND 3D display products have always been considered as the trend for display technology and many enterprises and research organizations are involved within the related researches. Developed countries and regions such as Japan, Europe and America started research and development of 3D display technology as early as 1980s and produced research results since 1990s.

Nowadays, 3D display technology is a new technology in display field. 3D display technology may be classified into naked-eye and glasses 3D display technologies. During manufacturing of 3D display products such as LCD 3D displays, there has been no objective testing method for 3D display products. At present, testing of 3D display products is generally implemented by naked eye inspection on 3D display products that display images. However, this method is subjected to subjective influence of the detecting people and has no quantized data as basis, hence incapable of forming unified, objective and deterministic detection data. Therefore, testing results have low accuracy.

SUMMARY

Embodiments of the present disclosure provides an optical testing method and system for 3D display products, which are capable of testing 3D display products, obtaining objective and accurate test data, and realizing quantized test for 3D display products.

One aspect of the present disclosure provides an optical testing system for three dimensional (3D) display products comprising a left eye lens, a right eye lens and a data processor; the left eye lens and the right eye lens are connected with the data processor via signal lines respectively; the left eye lens and the right eye lens are configured to receive light signals of left eye pixels and right eye pixels of the 3D display product to be tested respectively and transmit the light signals to the data processor via the signal lines; the data processor is configured to process the received light signals to obtain test results.

Another aspect of the present disclosure provides an optical testing method for three dimensional (3D) display products comprising: step A in which a 3D display product to be tested displays white light and/or black light, a left eye lens and a right eye lens receive white light signals and/or black light signals of left eye pixels and right eye pixels respectively and transmit them to a data processor for processing, and obtaining test results for brightness difference; step B in which the 3D display product to be tested displays primary colors, the left eye lens and the right eye lens receive light signals of the left eye pixels and the right eye pixels respectively and transmit them to the data processor for processing, and obtaining test results for color difference.

The optical testing method and system for 3D display products provided in embodiments of the present disclosure can greatly enhance accuracy and controllability of testing of 3D display products and mitigate influence of subjective factors.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF DRAWINGS

The present disclosure will become more fully understood from the detailed description given hereinafter and the accompanying drawings which are given by way of illustration only, and thus are not limitative of the present disclosure and wherein.

LIST OF REFERENCE NUMERALS

Figure 1:
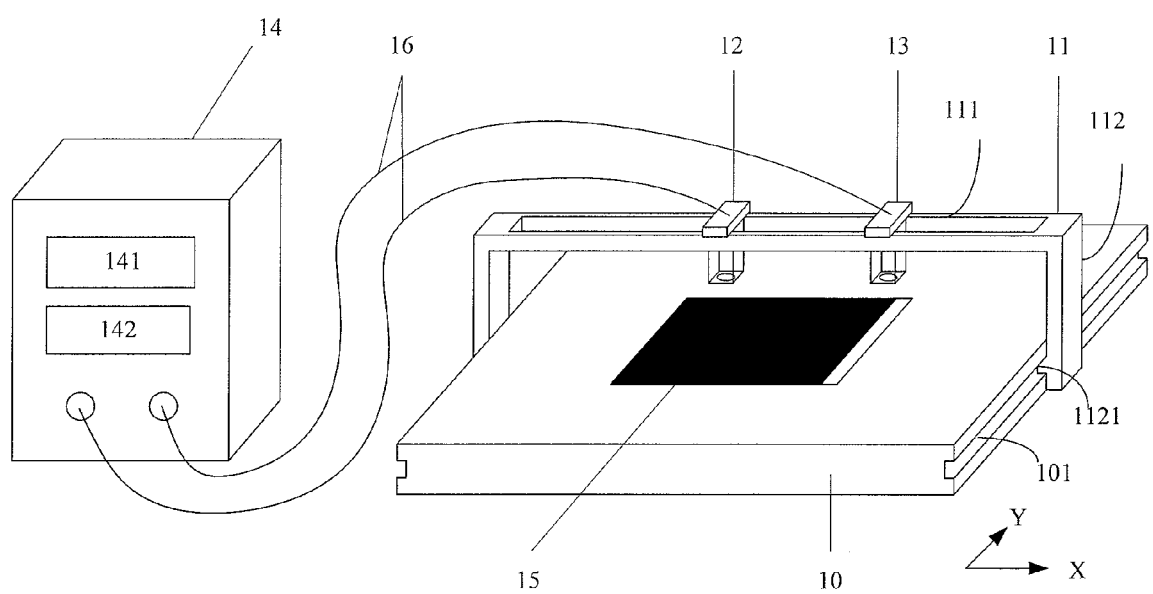
FIG. 1 is a structural representation of an optical testing system for 3D display products according to the present disclosure.

10: Base 11: Two-way slide rod 12: Left eye lens 13: Right eye lens 14: Data processor 15: 3D display product to be detected 16: Optical fiber cable

DETAIL DESCRIPTION

The present disclosure will be further described in detail below with reference to drawings and specific embodiments.

Unless otherwise defined, all the technical and scientific terms used herein have the same meanings as commonly understood by one of ordinary skill in the art to which the present disclosure belongs. The phrases "first," "second," etc., which are used in the description and the claims of the present application for disclosure, are not intended to indicate any sequence, amount or importance, but distinguish various components. Also, the terms such as "a," "an," "the," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In an embodiment of the present disclosure, the 3D display product to be tested displays white light and/or black light, the left eye lens and the right eye lens of a testing device receive white light signal and/or black light signal of left eye pixels and right eye pixels respectively and transmit them to a data processor for processing, resulting in test result for luminance difference; the 3D display product to be tested displays at least a kind of primary colors, the left eye lens and the right eye lens receive the primary color light signals of left eye pixels and right eye pixels respectively and transmit them to the data processor for processing, resulting in test results for color difference.

FIG. 1 is a structural representation of an optical testing system for 3D display products according to one embodiment of the present disclosure. As shown in FIG. 1, the system includes a base 10, a two-way slide rod 11, a left eye lens 12, a right eye lens 13 and a data processor 14. The base 10 is configured to carry the 3D display product 15 to be tested, which can be laid on the base 10. Both lateral sides of the base 10 can be formed with grooves 101. The two-way slide rod 11 includes a body 111 and a pair of supports 112 that have bumps 1121 embedded in grooves 101 provided on both lateral sides of the base 10. The bumps 1121 can slide horizontally in the grooves 101 to drive the entire two-way slide rod 11 move horizontally in the Y-axis direction in the drawing, thereby different pixel points (sampling points) on the 3D display product 15 to be tested can be tested. The left eye lens 12 and the right eye lens 13 are mounted on the body 111 of the two-way slide rod 11 and can move horizontally in the direction (in the X-axis direction in the drawing) perpendicular to the two-way slide rod 11 on the body 111. The height of the supports 112 can be adjusted as desired, and for example, to be equal to the minimum distance to the 3D display product 15 to be tested without cross talks. The left eye lens 12 and the right eye lens 13 are connected with the data processor 14 via signal lines such as optical fiber cables 16. The left eye lens 12 and the right eye lens 13 are configured to receive light signals of left eye pixels and right eye pixels of the 3D display product to be tested respectively and transmit the received light signals to the data processor 14 via the optical fiber cables 16. The data processor 14 is configured to process received light signals to obtain test results. The data processor 14 may include a photoelectric conversion unit 141 for processing the received the light signals to obtain related test results and a lighting control unit 142. The lighting control unit 142 is configured to control display of the 3D display product 15 to be tested, such as switching on (namely lighting up) or switching off the 3D display product 15 in testing.

In one example, the left eye lens 12 and the right eye lens 13 comprise their respective built-in photoelectric conversion units, and then transmit the converted electric signals to the data processor 14 via signal lines such as cables for further processing, thereby obtaining respective data.

Based on the above-mentioned system, one embodiment of the present disclosure further provides an optical testing method for 3D display products. The optical testing method for 3D display products according to embodiments of the present disclosure includes the following steps.

Step 201, determining a test location of the 3D display product to be tested and adjusting locations of the left eye lens and the right eye lens according to the test location.

For example, when a 3D display product is transferred for testing, the 3D display product 15 to be tested is placed on the base 10, the lighting control unit 142 of the data processor 14 lights up the screen of the 3D display product 15 to be tested and the screen of the 3D display product 15 functions to implement normal 3D display. For a 3D display product, in order to obtain more comprehensive test results, multiple sampling points need to be tested. For example, the screen of the 3D display product may be equally divided into three parts in both horizontal and vertical directions to get all together 3×3=9 parts with center points of each of the 9 parts being used as test locations. Testing the screen of the 3D display product with these test locations may realize 9 sampling points test.

Figure 2:
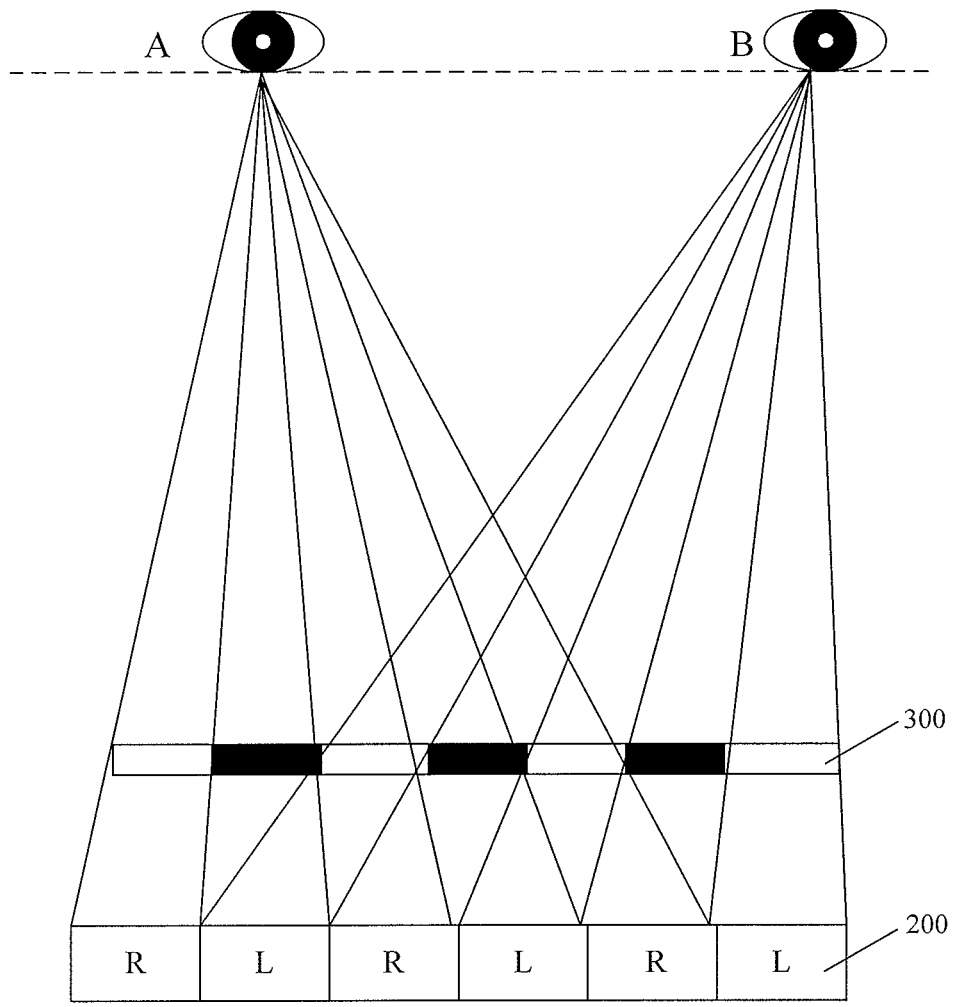
FIG. 2 is a principle schematic diagram for 3D display.

Broad viewing angle lens or the like may be used for both the left eye lens A and the right eye lens B. Here, the left eye lens A imitates left eye of a human to receive light signals the left eye supposed to see in a real 3D display image/video, and the right eye lens B imitates the right eye to receive light signals the right eye supposed to see in a real 3D display image/video. After determining one test location, with the test location as the center point, the distance between two lenses is adjusted to be close to the distance between two eyes of a human, i.e., interocular distance, for example, 60 mm or so for an Asian adult person; thus both the left and right lenses are 30 mm away from the test location. According to 3D imaging principle, as shown in FIG. 2, the 3D display product is a naked-eye 3D display product including a screen 200 and a parallax barrier 300 disposed in front of the screen 200. Due to the presence of the parallax barrier 300, the left eye lens A and the right eye lens B imitating left eye and right eye respectively can only see, for example, odd numbered columns of pixels and even numbered columns of pixels on the screen 200 of the 3D display product, which may be referred to as left eye pixels A and right eye pixels B respectively. The principle for 3D display is to control odd numbered columns of pixels and even numbered columns of pixels to display different information through parallax between left and right eyes, such that different signals received by the left and right eyes are then recombined in brain to obtain stereo vision, hence a 3D display effect can be obtained.

Although FIG. 2 explains an example of a display product that realizes 3D display effect with a parallax barrier, the present disclosure is not limited thereto. For example, the 3D display product of the embodiments of the present disclosure also may be a 3D display product based on a lenticular lens technology, and also may a 3D display product based on multi-layer display (MLD). The screen may be for example a liquid crystal display, a plasma display screen, an electronic ink screen, etc.

Furthermore, in another embodiment of the present disclosure, positional relation between the left eye lens A and the right eye lens B is not limited to the arrangement with an inter-eye distance between each other for imitating a viewer, the two lenses may also be arranged separately as long as they can receive lights from left eye pixels and right eye pixels.

Step 202, after lighting up the 3D display product to be tested, the 3D display product displays white light and/or black light, and the left eye lens and the right eye lens receive white light signals and/or black light signals and transmit them to the data processor for further processing to obtain test results of luminance difference.

For example, after the lighting control unit 142 of the data processor 14 lights up the screen of the 3D display product 15 to be tested, firstly, the signal input of the 3D display product 15 to be tested is adjusted to make the screen of the 3D display product 15 display white light. That is, with a gray scale range of 0~255 (namely brightness expressed in 8 bits), the gray scale of the screen is adjusted to be 255, then the screen of the 3D display to be tested have all its pixels exhibit maximum brightness. The left eye lens A and the right eye lens B will receive white light signals respectively and transmit the white light signals to the data processor 14 via optical fiber cables 16, the photoelectric conversion unit 141 in the data processor 14 obtains brightness values A255 and B255 according to the white light signals. In a similar way, the screen of the 3D display product 15 to be tested is made to display black light, that is, the gray scale of the screen is adjusted to be 0, with all pixels exhibiting minimum brightness. The left eye lens A and the right eye lens B will receive black light signals respectively and transmit the black light signals to the data processor 14 via optical fiber cables 16, the photoelectric conversion unit 141 in the data processor 14 obtains brightness values A0 and B0 according to the black light signals.

Then, the signal input of the 3D display product 15 to be tested is adjusted to make all left eye pixels corresponding to the left eye lens A to display white light, that is, adjusting the gray scale of left eye pixels corresponding to left eye lens A in the screen to be 255, and at the same time, make all right eye pixels corresponding to the right eye lens B to display black light, that is, adjusting the gray scale of right eye pixels corresponding to right eye lens B in the screen to be 0. The left and right lenses A and B receive respective light signals and transmit the received light signals to the data processor 14 via optical fiber cables 16. The photoelectric conversion unit 141 in the data processor 14 obtains brightness values A1 and B1 according to light signals received by left and right lenses respectively, and the photoelectric conversion unit calculates a high brightness difference value □A(white)=abs(A1−A255) and a high brightness difference value □B(black)=abs(B1−B0). In a similar way, all left eye pixels corresponding to the left eye lens A are again made to display black light and all right eye pixels corresponding to the right eye lens B display white light, the left and right lenses A and B receive light signals respectively and transmit received light signals to the data processor 14 via optical fiber cables 16. The photoelectric conversion unit 141 in the data processor 14 obtains brightness values A2 and B2 according to light signals received by left and right lenses respectively, and the photoelectric conversion unit 14 calculates a low brightness difference value □A(black)=abs(A2−A0) and a low brightness difference value □B(white)=abs(B2−B255).

Test results are thus obtained: a high brightness difference value of the left eye lens A, □A(white), and a low brightness difference value, □A(black), and a high brightness difference value of the right eye lens B, □B(white), and a low brightness difference value, □B(black). The brightness difference values are used to represent accuracy of brightness while the 3D display product is playing 3D images. Theoretically, the left eye lens A that imitates left eye is supposed to receive light signals of only left eye pixels and its test result reflects completely the brightness of left eye pixels. Similarly, the right eye lens B that imitates right eye is supposed to receive light signals of only right eye pixels and its test result reflects completely the brightness of right eye pixels. The above-mentioned resulting brightness difference values reflect whether light signals received by the lenses are from pixels corresponding to the lenses. If the left eye lens A is not aligned to left eye pixels perfectly but covers a portion of right eye pixels, then the test result will have significantly larger □A(white) and □A(black), which implies problems in relevant designs of the 3D display products, and therefore improvements and adaptations are desired. For example, if there is a difference value greater than the desired brightness value of the 3D display product by 3% for the test results, that is, the high brightness difference value □A(white) and the low brightness difference value □A(black) of the left eye lens, and the high brightness difference value □B(white) and the low brightness difference value □B(black) of the right eye lens, the result is considered as a larger difference value and therefore adaptations and improvements are required for the 3D display product. The desired brightness value of the 3D display product varies significantly depending on different products and different requirements on brightness. It is generally, for example, 200 nit, 250 nit or 350 nit.

The expression of gray-scale is not limited to 8 bits, it may be of e.g., 16 bits, then the value may be 0~65536. The present disclosure is not limited thereto.

Step 203, displaying, by the 3D display product to be tested, red, green and blue pixels, receiving, by the left eye lens and the right eye lens, pixel light signals and transmitting them to the data processor for processing, resulting in test results for color difference.

In the 3D display product according to this embodiment, each pixel point includes three primary color pixels, e.g., red, green and blue pixels, and receives corresponding color signals; however, the present disclosure is not limited thereto. For example, each pixel point may has other configurations, such as red, green, blue and yellow pixels (namely RGBY) or cyan, magenta, yellow and black pixels (namely CMYK). Explanation will be given below with an example that each pixel point includes a red, a green and a blue pixel.

When human eyes are actually viewing a screen of a 3D display product, they not only have visual response to light brightness but also are more sensitive to color difference, and therefore it is desired to further test color difference for the two lenses.

Firstly, the signal input of the 3D display product 15 to be tested is adjusted to make the screen display red light, that is, R, G and B pixels have gray scales corresponding to 255, 0, and 0 respectively. Thus, both the left eye lens A and the right eye lens B receive red light signals and transmit them to the data processor 14 via optical fiber cables 16. The photoelectric conversion unit 141 in the data processor 14 obtains the color coordinate of the screen of the 3D display product 15 to be tested in the case of full screen of red according to the red light signals, which is denoted as (Rx, Ry). The signal input of the 3D display product 15 to be tested is adjusted to make the screen display green light, that is, R, G and B pixels have gray scales corresponding to 0, 255, and 0 respectively. Thus, both the left eye lens A and the right eye lens B receive green light signals and transmit them to the data processor 14 via optical fiber cables 16. The photoelectric conversion unit 141 in the data processor 14 obtains the color coordinate of the screen of the 3D display product 15 to be tested in the case of full screen of green according to the green light signals, which is denoted as (Gx, Gy). The signal input of the 3D display product 15 to be tested is adjusted to make the screen display blue light, that is, R, G and B pixels have gray scales corresponding to 0, 0, and 255, respectively. Thus, both the left eye lens A and the right eye lens B receive blue light signals and transmit them to the data processor 14 via optical fiber cables 16. The photoelectric conversion unit 141 in the data processor 14 obtains the color coordinate of the screen of the 3D display product 15 to be tested in the case of full screen of blue according to the blue light signals, which is denoted as (Bx, By). In the embodiment of the present disclosure, each set of color coordinates is constituted of two values, x and y.

Then, signal input of the 3D display product 15 to be tested is adjusted to make all left eye pixels in the 3D display product 15 to be tested corresponding to the left eye lens A to display in red, that is, R, G and B pixels have gray scales corresponding to 255, 0, and 0 respectively, and make all right eye pixels in the 3D display product 15 to be tested corresponding to the right eye lens B to display in reverse color of red, that is, R, G and B pixels have gray scales corresponding to 0, 255, and 255 respectively. Thus, the left eye lens A receives red pixel light signals and transmit them to the data processor 14. The photoelectric conversion unit 141 in the data processor 14 obtains color coordinates corresponding to red (RLx, RLy) according to the red pixel light signals. Signal input of the 3D display product 15 to be tested is adjusted to make all left eye pixels in the 3D display product 15 to be tested corresponding to the left eye lens A to display in green, that is, R, G and B pixels have gray scales corresponding to 0, 255, and 0 respectively, and make all right eye pixels in the 3D display product 15 to be tested corresponding to the right eye lens B to display in reverse color of green, that is, R, G and B pixels have gray scales corresponding to 255, 0, and 255 respectively. Thus, the left eye lens A receives green pixel light signals and transmit them to the data processor 14. The photoelectric conversion unit 141 in the data processor 14 obtains color coordinates corresponding to green (GLx, GLy) according to the green pixel light signals. Signal input of the 3D display product 15 to be tested is adjusted to make all left eye pixels in the 3D display product 15 to be tested corresponding to the left eye lens A to display in blue, that is, R, G and B pixels have gray scales corresponding to 0, 0, and 255 respectively, and make all right eye pixels in the 3D display product 15 to be tested corresponding to the right eye lens B to display in reverse color of blue, that is, R, G and B pixels have gray scales corresponding to 255, 255, and 0 respectively. Thus, the left eye lens A receives blue pixel light signals and transmit them to the data processor 14. The photoelectric conversion unit 141 in the data processor 14 obtains color coordinates corresponding to blue (BLx, BLy) according to the blue pixel light signals.

Subsequently, in the same way, signal input of the 3D display product 15 to be tested is adjusted to make all right eye pixels in the 3D display product 15 to be tested corresponding to the right eye lens B to display in red, that is, R, G and B pixels have gray scales corresponding to 255, 0, and 0 respectively, and make all left eye pixels in the 3D display product 15 to be tested corresponding to the left eye lens A to display in reverse color of red, that is, R, G and B pixels have gray scales corresponding to 0, 255, and 255 respectively. Thus, the right eye lens B receives red pixel light signals and transmit them to the data processor 14. The photoelectric conversion unit 141 in the data processor 14 obtains color coordinates corresponding to red (RRx, RRy) according to the red pixel light signals. Signal input of the 3D display product 15 to be tested is adjusted to make all right eye pixels in the 3D display product 15 to be tested corresponding to the right eye lens B to display in green, that is, R, G and B pixels have gray scales corresponding to 0, 255, and 0 respectively, and make all left eye pixels in the 3D display product 15 to be tested corresponding to the left eye lens A to display in reverse color of green, that is, R, G and B pixels have gray scales corresponding to 255, 0, and 255 respectively. Thus, the right eye lens B receives green pixel light signals and transmit them to the data processor 14. The photoelectric conversion unit 141 in the data processor 14 obtains color coordinates corresponding to green (GRx, GRy) according to the green pixel light signals. Signal input of the 3D display product 15 to be tested is adjusted to make all right eye pixels in the 3D display product 15 to be tested corresponding to the right eye lens B to display in blue, that is, R, G and B pixels have gray scales corresponding to 0, 0, and 255 respectively, and make all left eye pixels in the 3D display product 15 to be tested corresponding to the left eye lens A to display in reverse color of blue, that is, R, G and B pixels have gray scales corresponding to 255, 255, and 0 respectively. Thus, the right eye lens B receives blue pixel light signals and transmit them to the data processor 14. The photoelectric conversion unit 141 in the data processor 14 obtains color coordinates corresponding to blue (BRx, BRy) according to the blue pixel light signals.

Finally, the photoelectric conversion unit 141 of the data processor 14 obtains color coordinate difference values for the left eye lens A:

Red Color: $\Delta x(Red)=abs(Rx-RLx), \Delta y(Red)=abs(Ry-Rly)$;

Green Color: $\Delta x(Green)=abs(Gx-GLx), \Delta y(Green)=abs(Gy-Gly)$;

Blue Color: $\Delta x(Blue)=abs(Bx-BLx), \Delta y(Blue)=abs(By-Bly)$;

The photoelectric conversion unit 141 of the data processor 14 obtains color coordinate difference values of the right eye lens:

Red Color: $\Delta x(Red)=abs(Rx-RRx), \Delta y(Red)=abs(Ry-Rry)$;

Green Color: $\Delta x(Green)=abs(Gx-GRx), \Delta y(Green)=abs(Gy-Gry)$;

Blue Color: $\Delta x(Blue)=abs(Bx-BRx), \Delta y(Blue)=abs(By-Bry)$;

As the test results for color difference, the color coordinate difference values for the left eye lens A and the right eye lens B may reflect difference in color characteristics of the lenses of the 3D display product in different color distribution, and in turn reflect whether the left eye lens A and the right eye lens B are well matched with the left eye pixels and the right eye pixels. Smaller color coordinate difference values means better optical effect of a 3D product, and more realistic 3D effect in viewing of the 3D display products with eyes, and less unwanted disturbance. Here, to facilitate quantization, the x and y coordinates may be transformed into u' and v' coordinates. For u' and v' coordinates, for example, when the color coordinate difference values $\Delta u'v' <= 0.02$, the 3D display product is not necessary for adaptation and improvement.

Steps 201~203 may be repeated cyclically to accomplish tests of multiple sampling points on the display product, obtaining more comprehensive test results.

What is described above is only preferred embodiments of the present disclosure and not intended to limit the scope of the present disclosure. Any modifications, equivalent substitutions and improvements made in the spirit and principle of the present disclosure are intended to be included in the scope of the present disclosure.

What is claimed is:

1. An optical testing system for three dimensional (3D) display products, comprising: a left eye lens, a right eye lens, a data processor, a base, and a two-way slide rod; wherein,
   the left eye lens and the right eye lens are connected with the data processor via signal lines respectively;
   the left eye lens and the right eye lens are configured to receive light signals of left eye pixels and right eye pixels of the 3D display product to be tested respectively and transmit the light signals to the data processor via the signal lines; and
   the data processor is configured to process the received light signals to obtain test results;
   the base is configured to carry thereon the 3D display product to be tested;
   the left eye lens and the right eye lens are mounted on the body of the two-way slide rod; and the left eye lens and the right eye lens are capable of moving horizontally on the body in a direction perpendicular to the direction in which the two-way slide rod moves.

2. The system according to claim 1, wherein the base is provided with grooves on both lateral sides; the two-way slide rod comprises a body and a pair of supports having bumps positioned in the grooves on the both lateral sides of the base, and the two-way slide rod moves in a horizontal direction by horizontal sliding of the bumps in the grooves.

3. The system according to claim 1, wherein the data processor comprises a photoelectric conversion unit and a lighting control unit; wherein
   the photoelectric conversion unit is configured to process the received light signals to obtain the test results; and
   the lighting control unit is configured to control display of the 3D display product to be tested.

4. The system according to claim 1, wherein the left eye lens and the right eye lens comprises photoelectric conversion units for processing the received light signals;
   the data processor comprises a lighting control unit for controlling display of the 3D display product to be tested.

5. An optical testing method for three dimensional (3D) display products, comprising:
   step A in which a 3D display product to be tested displays white light and/or black light, a left eye lens and a right eye lens receive white light signals and/or black light signals of left eye pixels and right eye pixels respectively and transmit them to a data processor for processing, obtaining test results for brightness difference; and
   step B in which the 3D display product to be tested displays primary colors, the left eye lens and the right eye lens receive light signals of the left eye pixels and the right eye pixels respectively and transmit them to the data processor for processing, obtaining test results for color difference;
   wherein the primary colors include red, green and blue colors; and
   wherein the step B comprises:
      obtaining color coordinates (Rx, Ry), (Gx, Gy) and (Bx, By) for full screen in red, green and blue colors of the screen of the 3D display product to be tested;
      adjusting signal input of the 3D display product to be tested to make all left eye pixels of the 3D display product to be tested display in red, green and blue successively, and all right eye pixels of the 3D display product to be tested successively display in reverse color of red, reverse color of green, and reverse color of blue accordingly, so that the data processor successively obtains color coordinates (RLx, RLy), (GLx, GLy), (BLx, Bly) accordingly;
      adjusting signal input of the 3D display product to be tested to make all right eye pixels of the 3D display product to be tested display in red, green and blue successively, and all left eye pixels of the 3D display product to be tested successively display in reverse color of red, reverse color of green, and reverse color of blue accordingly, so that the data processor successively obtains color coordinates (RRx, RRy), (GRx, GRy), (GRx, BRy), accordingly; and
      obtaining, by the data processor, color coordinate difference values according to the obtained color coordinates.

6. The method according to claim 5, before the step A, further comprising:
   step A' in which a test location of the 3D display product to be tested is determined and locations of the left eye lens and the right eye lens are adjusted according to the test location.

7. The method according to claim 6, wherein the step A' comprises:
   placing the 3D display product to be tested on the base and lighting up a screen of the 3D display product to be tested; and
   dividing the screen of the 3D display product to be tested into a plurality of parts each has its center point as the test location.

8. The method according to claim 5, wherein the left eye lens receives light signals which a viewer's left eye is supposed to see in viewing 3D display images, the right eye lens receives light signals which a viewer's right eye is supposed to see in viewing 3D display images, the two lenses are centered at the test location and a distance between the two lenses is adjusted to a distance between two eyes of an adult human.

9. The method according to claim 5, wherein the step A comprises:
   adjusting signal input of the 3D display product to be tested to make the screen of the 3D display product to be tested to display white light, so that the left eye lens and the right eye lens transmit respectively received white light signals to the data processor, and the data processor obtains brightness values A255 and B255; and making the screen of the 3D display product to be tested to display black light, so that the left eye lens and the right eye lens transmit respectively received black light signals to the data processor, and the data processor obtains brightness values A0 and B0; and
   adjusting signal input of the 3D display product to be tested to make all left eye pixels corresponding to the left eye lens display white light and black light successively, and all right eye pixels corresponding to the right eye lens successively display black light and white light correspondingly, so that the left and right lenses transmit the respectively received light signals to the data processor that obtains brightness values A1, B1 and A2, B2, correspondingly; and
   obtaining, by the data processor, a high brightness difference value and a low brightness difference value for the left eye lens and a high brightness difference value and a low brightness difference value for the right eye lens.

10. The method according to claim 5, wherein the obtaining color coordinates (Rx, Ry), (Gx, Gy) and (Bx, By) for full screen in red, green and blue colors of the screen of the 3D display product to be tested comprises:
    adjusting signal input of the 3D display product to be tested to make the screen of the 3D display product to be tested display red light, green light and blue light successively, so that the left eye lens and the right eye lens each receives red light signals, green light signals and blue light signals successively, the data processor obtains color coordinates (Rx, Ry), (Gx, Gy), (Bx, By) for full screen in red, green and blue colors of the screen of the 3D display product to be tested accordingly.

* * * * *